United States Patent
Fischer et al.

(10) Patent No.: US 6,589,495 B2
(45) Date of Patent: Jul. 8, 2003

(54) PROCESS FOR REDUCING THE LEVELS OF HALOGENATED HYDROCARBONS

(75) Inventors: Stefan Fischer, Nufringen (DE);
Günther Pajonk, Zapfendorf (DE);
Frank Witzel, Bloomfield Hills, MI (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/852,350

(22) Filed: May 9, 2001

(65) Prior Publication Data

US 2001/0038814 A1 Nov. 8, 2001

Related U.S. Application Data

(63) Continuation of application No. PCT/DE99/03411, filed on Oct. 26, 1999.

(30) Foreign Application Priority Data

Nov. 9, 1998 (DE) .......................... 198 51 555

(51) Int. Cl.⁷ ................................. C01B 7/00
(52) U.S. Cl. ................................. 423/240 S
(58) Field of Search .................. 423/240 S, 240 R, 423/488, 481, 483

(56) References Cited

U.S. PATENT DOCUMENTS

| | | | | |
|---|---|---|---|---|
| 5,176,897 A | * | 1/1993 | Lester | 423/240 S |
| 5,214,014 A | | 5/1993 | Yoshimoto et al. | |
| 5,414,201 A | * | 5/1995 | Greene | 423/239.2 |
| 5,759,504 A | * | 6/1998 | Kanno et al. | 423/240 S |
| 5,877,391 A | * | 3/1999 | Kanno et al. | 423/240 R |

FOREIGN PATENT DOCUMENTS

| | | |
|---|---|---|
| DE | 195 04 597 A1 | 8/1996 |
| EP | 0 793 995 A1 | 9/1997 |
| JP | 63171643 | 7/1988 |
| JP | 3213 145 A | 9/1991 |
| JP | 08266870 | 10/1996 |
| WO | WO 91/04780 | 4/1991 |
| WO | WO 91/17828 | 11/1991 |

OTHER PUBLICATIONS

Siemens Internal Publication "Siemens Energieerzeugung": "DIOx–catalysts destroy dioxins in flue gases on incinerators", order no. A96001–U11–A293, 1995; no month.

G. Mayer–Schwinning et al.: "Reduction techniques for exhaust gas cleaning for PCDD/PCF", VDI–Berichte Nr. 1298, 1996, pp. 191–229; no month.

W. Weiss: "Reduction of PCDD/PCDF emissions in an iron ore sinter plant", VDI–Berichte Nr. 1298, 1996, pp. 269–285; no month.

* cited by examiner

Primary Examiner—Stanley Silverman
Assistant Examiner—Edward M. Johnson
(74) Attorney, Agent, or Firm—Laurence A. Greenberg; Werner H. Stemer; Gregory L. Mayback

(57) ABSTRACT

Catalyst body for breaking down halogenated hydrocarbons, in particular dioxins and/or furans, having an active material which comprises titanium dioxide, carbon and at least one active component which is selected from the group consisting of oxides and mixed oxides of the transition metals, of the lanthanides, of the actinides, of the alkali metals and alkaline-earth metals, of aluminum, of tin and of silicon. In an off-gas flowing through the catalyst body, the levels of hydrocarbons contained therein are effectively reduced in part by adsorption and in part by oxidation, in particular at temperatures below 250° C.

10 Claims, 1 Drawing Sheet

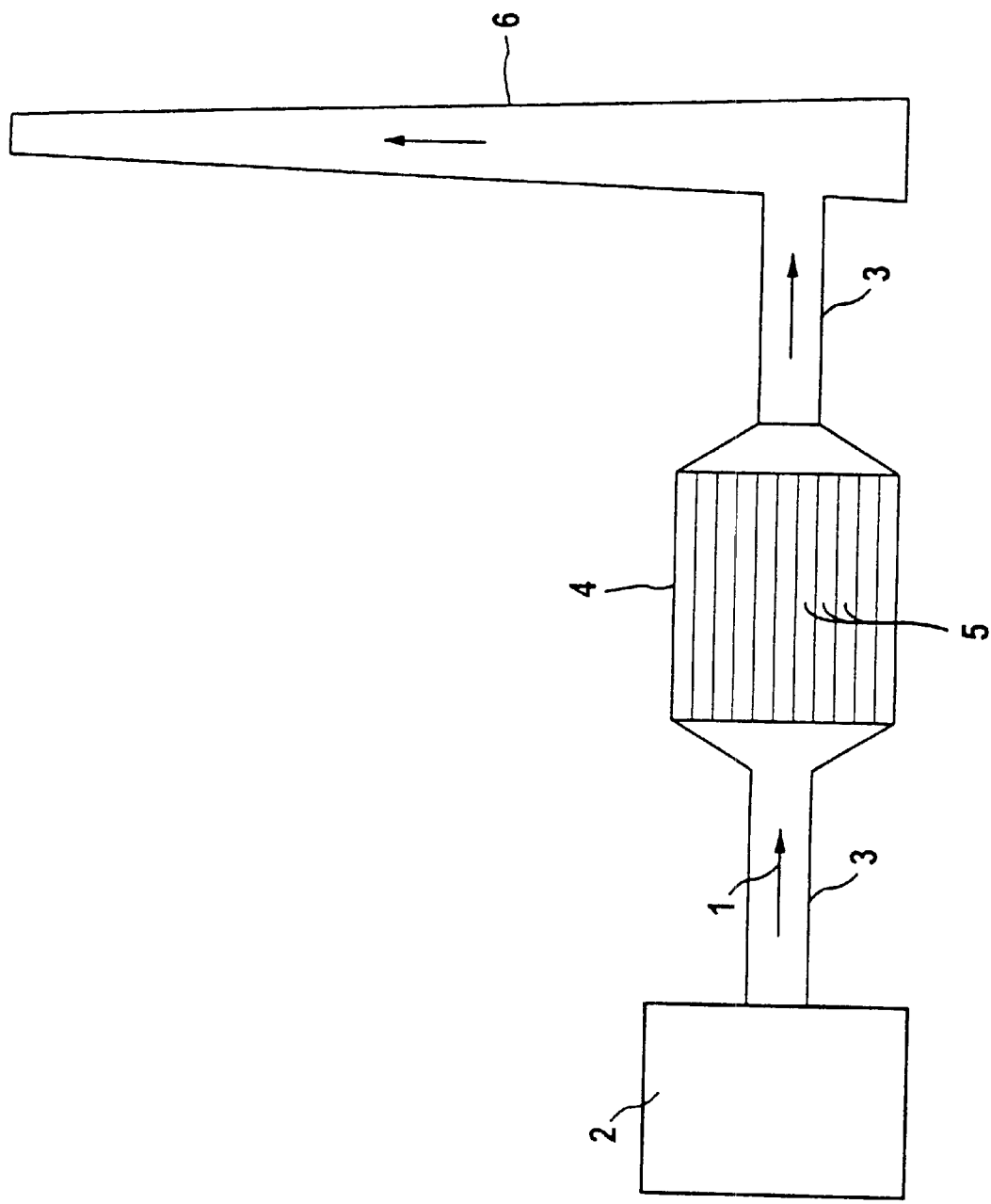

PROCESS FOR REDUCING THE LEVELS OF HALOGENATED HYDROCARBONS

CROSS-REFERENCE TO RELATED APPLICATION

This application is a continuation of copending International Application No. PCT/DE99/03411, filed Oct. 26, 1999, which designated the United States.

BACKGROUND OF THE INVENTION

Field of the Invention

The invention relates to a catalyst body for reducing the levels of halogenated hydrocarbons, in particular of dioxins and/or furans. The invention also relates to a process for reducing the levels of halogenated hydrocarbons, in particular of dioxins and/or furans, in which a gas stream which contains the halogenated hydrocarbons is passed over the catalyst body.

While many such halogenated compounds contain oxygen as well as hydrogen and carbon, the collective term "halogenated hydrocarbon" has become conventional for these in technical, toxicological and regulatory literature and is so used in the present specification and claims.

The off-gas from an industrial plant, such as for example a power plant which is operated with a fossil fuel, a refuse incineration plant or a sintering plant in which metal ore is made accessible to smelting by being sintered, contains not inconsiderable levels of halogenated hydrocarbons. Examples of halogenated hydrocarbons are chlorobenzenes, chlorophenols, polychlorinated biphenyls, and also polyhalogenated cyclic ethers (furans) and cyclic diethers (the actual dioxins). Many of these halogenated hydrocarbons, in particular the polychlorinated dibenzodioxins (PCDDs) and the polychlorinated dibenzofurans (PCDFs) are highly toxic to humans. For this reason, the permissible emission levels from an industrial plant for halogenated hydrocarbons of this type are subject to strict statutory guidelines.

To enable the statutory guidelines to be fulfilled, catalyst bodies are used to reduce the levels of halogenated hydrocarbons in the off-gas from the abovementioned industrial plants. For example, the Siemens company brochure "Diox-Katalysatoren zerstören Dioxine in den Rauchgasen von Müllverbrennungsanlagen" [Diox catalysts destroy dioxins in the flue gases from refuse incineration plants], order no. A96001-U11-A293, 1995, has disclosed a catalyst body through which off-gas can flow and which has an active material which is based on titanium dioxide and, in a temperature range of the off-gas to be treated of between 200 and 400° C., breaks down dioxins contained in the off-gas to form carbon dioxide, water and hydrogen halides.

In many cases, however, the temperature of the off-gas to be treated lies below 250° C., and consequently the catalytic activity of the abovementioned catalyst body becomes too low to still achieve effective reduction of the levels of halogenated hydrocarbons. In particular, low temperatures of this nature occur in the off-gas from a refuse incineration plant or a sintering plant. It is also known that at temperatures which lie below 200° C., the so-called DeNovo synthesis in the presence of organic carbon compounds, alkali metal or alkaline-earth metal chlorides and metal compounds which act as catalysts leads to dioxins and/or furans being formed again in the off-gas during cooling. In this case too, treatment of the off-gas in a temperature range in which the catalytic activity of the abovementioned catalyst body is no longer sufficient is required.

Therefore, other measures have to be taken in order to treat low-temperature off-gases. For this purpose, it is known from W. Weiss: "Minderung der PCDD/PCDF-Emissionen an einer Eisenerz-Sinteranlage" [Reducing the levels of PCDD/PCDF emissions from an iron ore sintering plant], VDI-Berichte No. 1298, (1996), pages 249 ff, to add a mixture of calcium hydroxide $Ca(OH_2)$ and carbon in the form of half-furnaced coke or activated carbon as an additive to the off-gas from a sintering plant after it has flowed through an electrostatic filter, to remove the additive which is partially laden with dioxins and/or furans again by means of dust filtering and to recycle this additive once again. In this case, the carbon serves as an adsorbing agent for the dioxins/furans, while the calcium hydroxide reduces the risk of spontaneous ignition of the carbon.

Furthermore, it is known from G. Mayer-Schwinning et al.: "Minderungstechniken zur Abgasreinigung für PCDD/F" [Techiques for reducing the levels of PCDD/F for off-gas cleaning], VDI-Berichte No. 1298, (1996), pages 191 ff, to add zeolites, as an additive which adsorbs dioxins/furans, to the off-gas from a refuse incineration plant after conventional off-gas cleaning with the aid of a fluidized-bed reactor. The zeolites which are partially laden with dioxins/furans and are situated in the off-gas are once again removed by means of dust filtering and fed back to the fluidized-bed reactor. From this process too it is known to add the zeolites to the off-gas together with calcium hydroxide.

It is a drawback that the adsorption capacity of the additive becomes exhausted over time, so that the consumed additive which is laden with dioxins/furans has to be landfilled and/or made non-hazardous by a thermal treatment or by being incorporated in a slag. Also, both the zeolites and the calcium hydroxide which is imperative when using carbon as additive are relatively expensive, so that observing emission limits for halogenated hydrocarbons in an industrial plant in this way entails high costs.

Furthermore, it is proposed in German published patent application DE 195 04 597 A1 to feed used DeNOx catalysts in powder form to the off-gas from an industrial plant in order to reduce the levels of the halogenated hydrocarbons contained therein. The DeNOx catalysts which are laden with the halogenated hydrocarbons are once again removed from the off-gas by means of dust filtering and fed back to the off-gas. In this process, both the adsorption capacity of the DeNOx catalyst and their activity with regard to oxidation of the halogenated hydrocarbons become fully exhausted. As base material, the specified DeNOx catalysts comprise titanium dioxide, and have additions of tungsten trioxide, vanadium pentoxide and molybdenum trioxide.

However, a drawback is the fact that the oxidation activity of the used DeNOx catalysts for breaking down the halogenated hydrocarbons is relatively low, so that a high mean contact time of the off-gas with the used DeNOx catalysts of several days is required. This is achieved by frequent recirculation of the DeNOx catalysts which have been added to the off-gas. Therefore, when using the used DeNOx catalysts as an additive, a complex recirculation process is required in order to treat the off-gas from an industrial plant.

WO 91/17828 has disclosed a catalyst body based on an ion-exchanged zeolite for breaking down halogenated hydrocarbons in a temperature range between 150 and 450° C. As metal ions, the ion-exchanged zeolite contains vanadium, chromium, cobalt, nickel, copper, iron, molybdenum or manganese and is additionally impregnated with titanium, vanadium, chromium, manganese, iron, cobalt, nickel, copper, molybdenum, palladium or platinum. The catalyst body is used in the form of pellets and oxidizes the halogenated hydrocarbons in the presence of oxygen, to form carbon dioxide and halo acids. A drawback is that a catalyst body of this type based on an ion-exchanged zeolite is relatively expensive. However, the discussed problem of complex recirculation when using an adsorbed additive is eliminated.

SUMMARY OF THE INVENTION

It is accordingly an object of the invention to provide a catalyst body and process for reducing the levels of halogenated hydrocarbons that overcomes the above-mentioned disadvantages of the prior art methods and devices of this general type, which is relatively inexpensive, is easy to use and is suitable for effective reduction of the levels of halogenated hydrocarbons even at temperatures below 250° C. A further object of the invention is to provide a simple and inexpensive process for reducing the levels of halogenated hydrocarbons from the off-gas from an industrial plant. Also, this process is to be suitable in particular for reducing the levels of halogenated hydrocarbons in a low-temperature off-gas, i.e. at a temperature below 250° C.

With the foregoing and other objects in view there is provided, in accordance with the invention, a process for the catalytic removal of halogenated hydrocarbon from a gas stream, comprising the steps of transporting a gas stream containing halogenated hydrocarbon into a reactor volume containing a catalyst body, and contacting the gas stream with a catalyst body comprising an active mass of titanium oxide, carbon, and at least one active component selected from the group consisting of oxides of the transition metals, the lanthanides, the actinides, the alkali metals, the alkaline earth metals, aluminum, tin, silicon, and mixtures thereof, whereby without addition of ozone a portion of the halogenated hydrocarbon is converted to halogen acid, carbon dioxide, and water, and a further portion of the halogenated hydrocarbon is adsorbed.

The halogenated hydrocarbons are, in particular, selected from the group consisting of halogenated dioxins and halogenated furans in view of the special toxicological concern affecting this group and the difficulties experienced by the art in effecting their removal.

The invention is in this case based on the fact that carbon has a good ability to adsorb halogenated hydrocarbons. As mentioned above, because of this property in the prior art carbon is added as an additive to the off-gas from a combustion plant which is to be treated, the halogenated hydrocarbons contained therein being adsorbed on the carbon and thus removed from the off-gas. However, in this known process the expensive material calcium hydroxide has to be added to the off-gas in order to prevent the carbon from igniting.

The invention is further based on the consideration that the adsorption property of carbon can still be utilized if it forms a constituent of the active material of a catalyst body. In addition, the level of oxides means that there is no risk of the carbon in the catalyst body being ignited. Furthermore, the invention is based on the second consideration that the mean contact time between the halogenated hydrocarbons and the catalyst body including carbon in accordance with the invention, because of the good adsorption capacity of the carbon, increases compared to the residence time on a catalyst body which does not contain carbon and has no adsorption capacity or only a low adsorption capacity. Even with a relatively low catalytic activity of the active material of the catalyst body at a low temperature, the high contact time means that the adsorbed halogenated hydrocarbons can be broken down effectively. The good catalytic activity of a catalyst body having an active material based on a titanium dioxide can therefore be improved further by the addition of carbon.

To achieve selective catalytic activities with regard to different halogenated hydrocarbons, the abovementioned oxides or mixed oxides are admixed as active components. The oxidative action of the active material extends the time which it takes for the adsorption capacity of the carbon to become exhausted.

Owing to the good adsorption capacity of the added carbon and the catalytic activity of the active material, the catalyst body can be shaped as a catalyst body in plate, honeycomb or pellet form through which the off-gas to be treated can flow. There is no need for complex recirculation in order to increase the contact time of the catalyst body with the off-gas to be treated. The invention offers the additional advantage that the catalyst body is considerably more favorable both in terms of the materials used and in terms of its production costs compared to a catalyst body based on a zeolite.

In addition, the invention offers the advantage that there is no increased emission of halogenated hydrocarbons even in the event of an uncontrolled rise in the temperature of the off-gas, as may occur, for example, in the event of an incident in the industrial plant. Although if the temperature were to rise above 350° C., the carbon contained in the catalyst body would burn off, the remaining composition of the active material would be retained. Consequently, the catalytic activity of the catalyst body is retained even at high temperatures. Since it is known that the catalytic activity rises as the temperature of the off-gas increases, the remaining active material ensures substantially complete decomposition of the halogenated hydrocarbons at the higher temperatures of the off-gas which then occur. Therefore, when the abovementioned catalyst body is used, it is possible to ensure that there is no environmental pollution even in the event of an incident at the industrial plant.

In the context of the invention, the term "carbon" is understood as meaning a "carbonized" carbon material (i.e. an almost pure carbon material which has been formed from organic material, such as for example, hard coal), and equally pure carbon, for example, in the form of medical carbon or graphite.

It is particularly advantageous if the carbon is in the form of activated carbon. The term activated carbon is understood as meaning carbon structures comprising extremely small graphite crystals and amorphous carbon, with a porous structure and an internal surface area of between 500 and 1500 $m^2/g$. On account of the high internal surface area, activated carbon has an excellent adsorption capacity for the halogenated hydrocarbons contained in the off-gas.

With regard to the adsorption capacity of the catalyst body, it is furthermore advantageous if the titanium dioxide contained therein is predominantly in the anatase modification and has a specific surface area of more than 50 $m^2/g$. Increasing the specific surface area of the titanium dioxide increases the adsorption capacity of the catalyst body and also its catalytic activity for conversion of the halogenated hydrocarbons.

For the catalytic activity for conversion of the halogenated hydrocarbons, it is furthermore advantageous if the active material comprises, as active components, vanadium pentoxide, tungsten trioxide and/or molybdenum trioxide. It is known that these components, when added to titanium dioxide, contribute to the oxidation activity of the active material with regard to the conversion of halogenated hydrocarbons.

Particularly good results from the catalyst body with regard to reducing the levels of halogenated hydrocarbons can be achieved if the active material contains 5–50% by weight carbon, 50–80% by weight titanium dioxide, 2–15% by weight tungsten trioxide, 0–10% by weight molybdenum trioxide, 0–10% by weight vanadium pentoxide, 0.1–6% aluminum oxide and 0.1–6% silicon dioxide. Furthermore, conventional fillers and binders, e.g. organic or inorganic fibers, can be admixed to the active material.

For practical use of the catalyst body, it is recommended for it to be shaped as a catalyst body through which gases can flow. Depending on the dust content of the off-gas to be treated, it may be advantageous for the catalyst body to be configured as an unsupported extrudate of the active material in honeycomb form or as a support in plate form which is coated with the active material. Compared to a catalyst body in plate form, a catalyst body in honeycomb form has the drawback of a greater tendency to become blocked, on account of the generally smaller cross section of the flow passages. However, the surface area of a catalyst body in honeycomb form which is freely accessible to the off-gas is generally larger than with the catalyst body in plate form. Therefore, the catalyst body in honeycomb form has a higher adsorption capacity and a higher catalytic activity with regard to the conversion of the halogenated hydrocarbons.

The catalyst body is produced in a manner known per se by mixing, comminuting and/or kneading the specified oxides or mixed oxides or their precursor compounds with carbon being added to the mixture and, if appropriate, with the addition of conventional auxiliaries and fillers. The kneadable material obtained in this way is then processed further to form unsupported extrudates or is applied as a coating to a ceramic or metal support in honeycomb or plate form. The body produced in this way is dried at 20 to 100° C. and calcined at 200 to 400° C. (depending on the concentration of the carbon in the catalyst body) to form the catalyst body.

Alternatively, to produce the catalyst body it is also possible first to produce the kneadable material from titanium dioxide, carbon and the auxiliaries and fillers, to further process the material to form the unsupported extrudate or to coat the support with the material and only then to introduce the active oxidation components by impregnation in a solution which contains the active components.

Furthermore, it is also possible first to produce a kneadable material as described above, but without carbon. The carbon-free support which has been coated with this material or the carbon-free unsupported extrudate produced from this material is then impregnated in a carbon/water mixture and thus coated with carbon.

The object in terms of the process for reducing the levels of halogenated hydrocarbons in achieved, according to the invention, in that a gas stream which contains the halogenated hydrocarbons, in particular dioxins and/or furans is passed over the catalyst body as described herein, some of the halogenated hydrocarbons being converted into water, carbon dioxide and halogen acid, and some of the halogenated hydrocarbons being adsorbed.

The adsorption of some of the halogenated hydrocarbons to a certain extent creates a temporary store thereof. As the residence time on the catalyst body increases or if the temperature of the off-gas temporarily rises, the adsorbed halogenated hydrocarbons are gradually converted.

The process for reducing the levels of halogenated hydrocarbons is particularly suitable for use at low temperatures of the off-gas, in particular at temperatures between 130 and 250° C.

Other features which are considered as characteristic for the invention are set forth in the appended claims.

Although the invention is illustrated and described herein as embodied in a catalyst body and process for reducing the levels of halogenated hydrocarbons, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE shows a catalyst body through which gases can flow in the off-gas duct of a sintering plant.

DESCRIPTION OF THE PREFERRED EMBODIMENTS

As shown in the FIGURE, the off-gas 1 is extracted from a sintering plant 2 (not shown in more detail) into an off-gas duct 3. In the sintering plant 2, metal ores which are present in the form of fine grains or fine dust are made lumpy by sintering, so that they can be smelted in a blast furnace. Since waste materials from the metal working industry which also include lubricants or drilling aids are made available for smelting, the off-gas 1 from the sintering plant 2 contains not inconsiderable levels of halogenated hydrocarbons and, in particular, dioxins and/or furans.

To reduce the levels of halogenated hydrocarbons contained in the off-gas, a catalyst body 4 in honeycomb form, through which the off-gas can flow, is disposed in the off-gas duct 3 of the sintering plant 2. For this purpose, the catalyst body 4 has a number of parallel passages 5 through which the off-gas can flow. The catalyst body 4 is produced as an unsupported extrudate from an active material which contains 10% by weight activated carbon, 74% by weight titanium dioxide in the anatase modification, 8% by weight tungsten trioxide, 6% by weight vanadium pentoxide, remainder ceramic auxiliaries and fillers.

The off-gas from the sintering plant 2 is at a temperature of approximately 160° C.

The halogenated hydrocarbons contained in the off-gas 1 are bound to the catalyst body 4 by adsorption and are gradually converted by oxidation. The off-gas from which the halogenated hydrocarbons have been removed after it has flowed through the catalyst body 4 passes into the environment via a stack 6.

The adsorption and oxidation capacity of the abovementioned catalyst body for halogenated hydrocarbons is shown by the following examples:

EXAMPLE 1

A model off-gas is passed, at a temperature of 150° C. and a space velocity of 12 000/h, over a catalyst body, which is configured as an unsupported extrudate in the form of a honeycomb body through which the off-gas can flow and which has an active material containing 10% by weight activated carbon, 74% by weight titanium dioxide in the anatase modification, 8% by weight tungsten trioxide, 6% by weight vanadium pentoxide, remainder ceramic auxiliaries and fillers. The catalyst body has a square surface area of 150×150 mm for the off-gas to flow onto and 1225 parallel flow ducts. The model gas comprises 200 ppm perchloroethene in air. Perchloroethene is used as a model substance for dioxin. The concentration of perchloroethene in the model gas is measured upstream of the catalyst body and downstream of the catalyst body.

A number of series of tests have determined the result that approximately 5% by weight perchloroethene is adsorbed on the catalyst body, based on its mass, and that the catalyst body catalytically converts approximately 10% of the perchloroethene.

EXAMPLE 2

A model off-gas is passed, at a temperature of 150° C. and a space velocity of 12 000/h, over a catalyst body, which is configured as an unsupported extrudate in the form of a honeycomb body through which off-gas can flow and which has an active material containing 50% by weight activated carbon, 6% by weight $V_2O_5$, 37% by weight $TiO_2$ in the anatase modification, 4% by weight $WO_3$, remainder ceramic auxiliaries and fillers. The catalyst body has a square surface area of 150×150 mm onto which off-gas can flow and 1225 parallel flow ducts. The model gas comprises 200 ppm perchloroethene in air. Perchloroethene is used as a model substance for dioxin.

The concentration of the perchloroethene in the model gas is measured upstream of the catalyst body and downstream of the catalyst body.

In a number of series of tests, the result was determined that approximately 10–20% by weight perchloroethene, based on the mass of the catalyst body, is adsorbed, and that the catalytic conversion by the catalyst body is approximately 5–10%.

At higher temperatures, of course, the conversion would rise accordingly in both examples.

We claim:

1. A process for reducing a level of halogenated hydrocarbon from a gas stream, comprising the steps of:

transporting a gas stream containing halogenated hydrocarbons into a reactor volume containing a catalyst body, and contacting the gas stream with the catalyst body having an active mass of 5–50% by weight carbon, 30–80% by weight titanium dioxide, 2–15% by weight tungsten trioxide, 0–10% by weight molybdenum trioxide and 0–10% by weight vanadium pentoxide; and without addition of ozone, converting a portion of the halogenated hydrocarbons to halogen acid, carbon dioxide, and water, and absorbing a further portion of the halogenated hydrocarbons.

2. The process of claim 1, wherein the halogenated hydrocarbons are selected from the group consisting of halogenated dioxins and halogenated furans.

3. The process of claim 1, wherein the gas stream contacts the catalyst body at a temperature in the range of 130–250° C.

4. The process of claim 1, wherein carbon is provided in the form of activated carbon.

5. The process of claim 1, wherein titanium dioxide is provided predominantly in the form of anatase having a surface area greater than 50 $m^2/g$.

6. The process of claim 1, wherein the active component is selected from the group consisting of vanadium pentoxide, tungsten trioxide, and molybdenum trioxide.

7. The process of claim 1, wherein the active mass contains 50% by weight activated carbon, 6% by weight $V_2O_5$, 37% by weight $TiO_2$ in the anatase modification, 4% by weight $WO_3$, and the remainder ceramic auxiliaries and fillers.

8. The process of claim 1, wherein the active mass contains 10% by weight activated carbon, 6% by weight $V_2O_5$, 74% by weight $TiO_2$ in the anatase modification, 8% by weight $WO_3$, and the remainder ceramic auxiliaries and fillers.

9. The process of claim 1, wherein the active mass is shaped as an extruded honeycomb.

10. The process of claim 1, wherein the catalyst body comprises a carrier plate coated with the active mass.

* * * * *